Nov. 16, 1954     C. L. HANCOCK     2,694,255
FLESHING KNIFE
Filed May 29, 1951
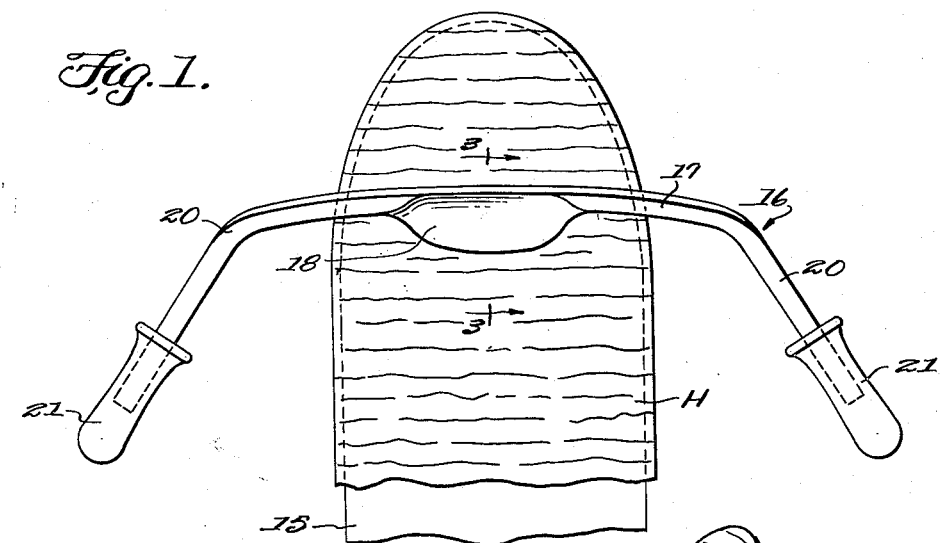
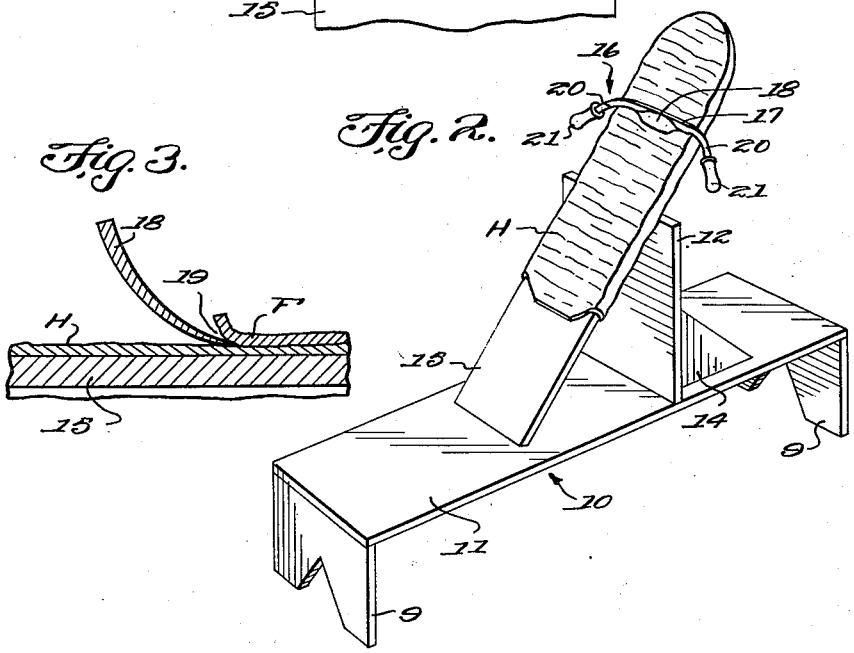
INVENTOR.
Charles Leon Hancock,
BY *Victor J. Evans & Co.*
ATTORNEYS

United States Patent Office 2,694,255
Patented Nov. 16, 1954

2,694,255

FLESHING KNIFE

Charles Leon Hancock, Cody, Nebr.

Application May 29, 1951, Serial No. 228,937

1 Claim. (Cl. 30—313)

This invention relates to a knife, and more particularly to a knife for removing the flesh from hides of fur-bearing animals.

The object of the invention is to provide a knife which will enable the user to easily and quickly remove the flesh or fat from hides or pelts of fur-bearing animals, the knife adapted to be gripped in the user's hands and moved along the hide.

Another object of the invention is to provide a knife which will facilitate the removal of the flesh from hides of fur-bearing animals, the knife being used and constructed so that the flesh and fat can be removed without damaging the fur.

A further object of the invention is to provide a fleshing knife which is extremely simple and inexpensive to manufacture.

Other objects and advantages will be apparent during the course of the following description.

In the accompanying drawings forming a part of this application, and in which like numerals are used to designate like parts throughout the same:

Figure 1 is a fragmentary front elevational view showing the knife of the present invention being used;

Figure 2 is a perspective view of the assembly for use in removing flesh from pelts or hides;

Figure 3 is an enlarged sectional view taken on the line 3—3 of Figure 1.

Referring in detail to the drawings, the numeral 10 designates a table or bench which is adapted to be used when flesh or fat F is being removed from fur-bearing hides H. The table 10 includes a horizontally disposed platform 11, and the platform 11 is adapted to be supported by a suitable spaced parallel vertically disposed legs 9. Extending upwardly from the platform 11 and secured thereto is a vertically disposed upright 12, there being a brace 14 extending between the upright 12 and the platform 11. An inclined board 15 is supported by the upright 12, and the board 15 provides a support for the hide H which is to be worked on.

The knife of the present invention is designated generally by the numeral 16, and the knife 16 includes a shank that may be made of any suitable material, such as metal. The shank comprises an intermediate portion 17 that has arranged thereon an arcuate spoon-like cutting blade 18. The cutting blade 18 is provided with a sharp cutting edge 19, as seen in Figure 3, so that by manually moving the knife 16 along the hide H, the flesh F can be cut or removed from the hide H.

Formed integrally with each end of the intermediate portion 17, or secured thereto, is an offset portion 20, and a hand grip 21 is mounted on each of the offset portions 20. Thus, the knife can be conveniently gripped by the user's hands and moved back and forth.

In use, the hide or pelt H to be worked on is arranged over the board 15, and the knife 16 of the present invention is gripped in the user's hand. Then, the user may sit on a portion of the platform 11 facing the hide H, and the knife 16 can be moved in a downward direction against the hide H. This will cause the blade 18 to cut away or remove the flesh F from the hide H so that the hide will be left in a marketable state.

It is to be understood that the knife of the present invention can be used with various types of tables or benches, and it is to be noted that the blade 18 of the knife is ground from the back side only. In other words, it is not ground sharp all the way across, but only through the center portion tapering off to a dull rounded edge as it approaches the handles, or hand grips 21. The offset portions 20 are shaped so that they will hold the pull of the blade 18 against the pull of the hand in a manner that will insure that the blade moves smoothly over the fur without clatter or without any tendency of the blade to turn under so that the operation can be performed with ease and dispatch. The bench can be used for skinning and fleshing fur, and the assembly is especially suitable for working on pelts of muskrats, mink, raccoon, beaver and the like. As previously stated, the knife will enable the flesh and fat to be easily and quickly removed and the pelt will not be damaged.

What is claimed is:

In a fleshing knife, a shank including an intermediate portion and an offset end portion extending at an obtuse angle from each end of said intermediate portion, a hand grip mounted on the end of each offset portion, said shank being enlarged between the ends of said intermediate portion to form an elongated integral blade, said blade being shaped arcuately in cross section and having one of its longitudinal edges arcuately shaped and beveled to form a cutting edge which merges into the intermediate portion of said shank.

References Cited in the file of this patent

UNITED STATES PATENTS

| Number | Name | Date |
|---|---|---|
| 361,176 | McDermott | Apr. 12, 1887 |
| 431,097 | Wilder | July 1, 1890 |
| 547,924 | Keltsch et al. | Oct. 15, 1895 |
| 1,836,519 | Wyman | Dec. 15, 1931 |
| 2,071,691 | Hayford | Feb. 23, 1937 |
| 2,178,019 | Knuteson | Oct. 31, 1939 |
| 2,424,060 | Shapiro | July 15, 1947 |
| 2,513,885 | May | July 4, 1950 |

FOREIGN PATENTS

| Number | Country | Date |
|---|---|---|
| 477,052 | France | June 26, 1915 |